United States Patent Office 3,410,864
Patented Nov. 12, 1968

3,410,864
BENZIMIDAZOLINONES
Robert W. Radue, Webster Groves, Mo., assignor to Monsanto Company, St. Louis, Mo., a corporation of Delaware
No Drawing. Filed May 27, 1965, Ser. No. 459,448
4 Claims. (Cl. 260—309.2)

ABSTRACT OF THE DISCLOSURE

This disclosure is new compounds of the formulas

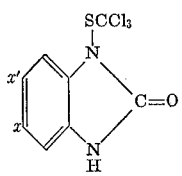

and

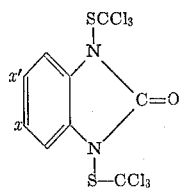

where $x$ and $x'$ are halogen, lower alkyl of from 1 to 5 carbon atoms, $NO_2$, and hydrogen. The compounds are useful fungicides, bacteriocides, and insecticides.

---

This invention relates to new compounds useful as fungicides, bacteriocides, and insecticides. The new compounds include 1-trichloromethylthio-2-benzimidazolinones of the formula

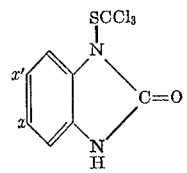

and 1,3-bis(trichloromethylthio)-2-benzimidazolinones of the formula

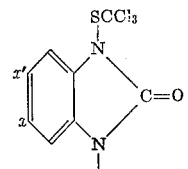

where $x$ and $x'$ are halogen, lower alkyl of from 1 to 5 carbon atoms, $NO_2$ and hydrogen. More particularly, the invention relates to new compounds, for example, 1,3-bis(trichloromethylthio) - 2 - benzimidazolinone, 1,3-bis(tricholormethylthio) - 5,6-dichloro-2-benzimidazolinone, 1,3-bis(trichloromethylthio) - 5 - chloro-2-benzimidazolinone, 1,3-bis(tricholormethylthio)-5-bromo-2-benzimidazolinone, 1-trichloromethylthio-2-benzimidazolinone, 1-trichloromethylthio-5,6-dichloro-2-benzimidazolinone, 1-trichloromethylthio-6-chloro-2-benzimidazolinone, 1-trichloromethylthio-5-chloro-2-benzimidazolinone and 1-trichloromethylthio-5-bromo-2-benzimidazolinone.

An object of the invention is to provide new and useful compounds to promote the progress of science and useful arts. Other objects of the invention will become apparent as the description of the invention proceeds.

Other examples of the compounds of the invention are 1,3-bis(trichloromethylthio) - 5,6 - dimethyl-2-benzimidazolinone, 1,3 - bis(trichloromethylthio)-5-methyl - 2 - benzimidazolinone, 1-trichloromethylthio-5,6-dimethyl-2-benzimidazolinone, 1-trichloromethylthio-5-methyl - 2 - benzimidazolinone, 1-trichloromethylthio-6-methyl - 2 - benzimidazolinone, 1,3 - bis(trichloromethylthio)-5,6-dinitro-2-benzimidazolinone, 1,3-bis(trichloromethylthio)-5-nitro-2-benzimidazolinone, 1-trichloromethylthio-5,6-dinitro-2-benzimidazolinone, 1-trichloromethylthio-5-nitro-2-benzimidazolinone, and 1-trichloromethylthio-6-nitro-2-benzimidazolinone.

1,3 - bis(trichloromethylthio)-5,6-dichloro-2-benzimidazolinone is prepared in the following manner. A solution of 5.1 grams (0.025 mole) of 5,6-dichloro-2-benzimidazolinone and 2.1 grams (0.053 mole) of sodium hydroxide in 500 ml. of water is prepared by heating and stirring the mixture on a hotplate. The solution is cooled to room temperature and 250 ml. of ethanol is added. Following additional cooling to 10° C., 5.5 ml. (9.3 grams, 0.05 mole) of trichloromethylsulfenyl chloride is added over a period of about 45 minutes while the temperature is kept below 10° C. The pH of the reaction mixture is noted during the course of the reaction. It starts at about 10.5 and then falls to about 7 after about two-thirds of the trichloromethylsulfenyl chloride is added. At this time an additional charge of 1.0 gram of sodium hydroxide is added to raise the pH of the mixture to 10. The final pH is about 1. The reaction mixture is allowed to stand overnight at room temperature, then about 24.5 grams of product is isolated by filtration. Recrystallization from ethanol-acetone mixture gives a crystalline product. A sample of the product melts at 218.5°–219.5° C. Analysis of this 1,3-bis(trichloromethylthio)-5,6-dichloro-2-benzimidazolinone shows 56.6% chlorine, 5.5% nitrogen and 12.8% sulfur. Calculated percentages for $C_9H_2Cl_8N_2OS_2$ are 56.52% chlorine, 5.58% nitrogen and 12.78% sulfur.

1,3 - bis(trichloromethylthio)-5-chloro-2-benzimidazolinone is prepared by the same general procedure as described above. The product is recrystallized from ethanol. A sample of the product melts at 163°–166° C. Analysis of this 1,3-bis(trichloromethylthio)-5-chloro-2-benzimidazolinone shows 52.2% chlorine, 6.3% nitrogen and 14.3% sulfur. Calculated percentages for $C_9H_3Cl_7N_2OS_2$ are 53.1% chlorine, 5.99% nitrogen and 13.7% sulfur.

1,3-bis(trichloromethylthio)-2-benzimidazolinone can be prepared by two methods. The first method is carried out in dimethylformamide (DMF) and triethylamine. The reaction is carried out in a three-necked, one-liter flask equipped with a mechanical stirrer, thermometer, and reflux condenser. To a solution of 13.4 g. (0.1 mole) of 2-hydroxybenzimidazole in 220 ml. of DMF at 10° C., there is added in one portion 37.0 g. (0.2 mole) of trichloromethyl sulfenyl chloride. The temperature of the solution increases to 15° C. as the result of the addition. The resulting yellowish solution is cooled to 0° C. with an acetone/ice bath and 24.0 g. (0.24 mole) of triethylamine is added at 0°–10° C. The resulting slurry is allowed to warm to room temperature, transferred to a two-liter beaker and quenched with 1500 ml. of ice water while stirring vigorously. Stirring is continued for 15 minutes and the resulting white solid is collected by filtration, washed several times with water and allowed to dry at room temperature. After several recrystallizations from ethyl acetate, the white solid has a melting point of 193°–194° C. Analysis of this 1,3-bis(trichloromethylthio)-2-benzimidazolinone shows 6.53% nitrogen and 14.45% sulfur. Calculated percentages for $C_9H_4Cl_6N_2OS_2$ are 6.45% nitrogen and 14.70% sulfur. The infrared spectrum of the material is consistent with the proposed structure.

The second method of preparing 1,3-bis(trichloromethylthio)-2-benzimidazolinone is carried out in water. To a well-stirred slurry of 2-hydroxybenzimidazole (13.4 grams) in water (120 grams) at 25° C., sodium hydroxide (40.0 grams—25%) is added in one portion with little or no temperature rise. The resulting solution is cooled to —5° C. and trichloromethylsulfenyl chloride (39.0 grams) dissolved in hydrocarbon solvent (84.0 grams) is added in one portion with vigorous agitation. The temperature increases rapidly to 9° C. and a precipitate forms immediately. The pH of the reaction mixture is 12.0. The reaction is allowed to continue for 15–20 minutes until the pH drops to 9.0. Over the next 30 minutes the pH is continuously adjusted to 12.0 by the addition of 20.0 grams of 25% NaOH. During this period the temperature is controlled by an external acetone/ice bath at —5° to 0° C. After adjusting the pH, trichloromethylsulfenyl chloride (5.5 grams) is added to compensate for the material which has been hydrolyzed. It is necessary to add an additional 10.0 grams of 25% NaOH during the next 15 minutes. An additional 84.0 grams of hydrocarbon solvent is then added to facilitate stirring of the slurry. The reaction is warmed to room temperature and the product collected by filtration. The material is allowed to dry on the filter cake for about 20 minutes and reslurried in 1.0 liter of water. Once again the white solid is collected by filtration and then dried at 60° C. in a circulating air oven. 31.2 grams of a white powder, melting point 180°–183° C. is obtained. After several recrystallizations from ethyl acetate, the white solid has a melting point of 193°–194° C. An infrared spectrum of the product shows it is essentially free of the starting material and the monosubstituted product. The yield is 73.0% based on 2-hydroxybenzimidazole.

The other 1,3-bis(trichloromethylthio)-2-benzimidazolinones of this invention are prepared in a similar manner to the preparations described above by using the desired substituted 2 - hydroxybenzimidazole or 2-benzimidazolinone.

1 - trichloromethylthio-2-benzimidazolinone is prepared in the following manner. To a solution of 11.8 grams (0.08 mole) of 2-hydroxybenzimidazole in 150 ml. of DMF at 0° C. there is added 18.5 grams (0.1 mole) of trichloromethylsulfenyl chloride in one portion with no temperature rise. Controlling the temperature between 0°–10° C. with an acetone/ice bath, 12.0 grams (0.12 mole) of triethylamine is added dropwise over a 10–15 minute period. A slurry is formed which is transferred to a two-liter beaker. The amine salt dissolves by the addition of 1500 ml. of ice water with vigorous agitation. A white solid is precipitated and collected by filtration. The filter cake is washed with several portions of water and allowed to dry at room temperature. Twenty grams of a white solid is obtained. After recrystallization from ethyl acetate, it has a melting point of 205° C. The yield is 80% of theory. Analysis of this 1-trichloromethylthio-2-benzimidazoline shows 10.61% nitrogen and 10.49% sulfur. Calculated percentages for $C_8H_5Cl_3N_2OS$ are 9.92% nitrogen and 11.70% sulfur. The other 1-trichloromethylthio-2-benzimidazolinones of this invention are prepared in a similar manner by using the desired substituted 2-hydroxybenzimidazole.

I have discovered that the compounds of this invention show bacteriostatic activity. 1,3-bis(trichloromethylthio)-5,6 - dichloro-2-benzimidazolinone, 1,3-bis(trichloromethylthio) - 2 - benzimidazolinone, 1-trichloromethylthio-2-benzimidazolinone and 1,3 - bis(trichloromethylthio)-5-chloro-2-benzimidazolinone show inhibition for the organism Staphylococcus aureus at dilutions of one part per 10,000.

I have also discovered that 1,3-bis(trichloromethylthio)-5,6-dichloro-2-benzimidazolinone has contact herbicidal properties. A 0.5% concentration of 1,3-bis(trichloromethylthio)-5,6-dichloro-2-benzimidazolinone has contact herbicidal properties when applied to the foliage of pigweed and tomato plants. The chemical received a 4 rating for the test on pigweed and a 3 rating on tomato. A 4 rating means the plant is dead, and a 3 rating means severe phytotoxicity. 1,3-bis(trichloromethylthio)-5-chloro-2-benzimidazolinone is an active insecticide. It shows insecticidal properties against the larvae of the southern armyworm Prodenia eridania and against the yellow fever mosquito larvae.

1-trichloromethylthio-2-benzimidazolinone is a fungicide valuable for controlling Venuria inaequalis, the cause of apple scab on apple trees. The method of testing this chemical is carried out in the following manner. Dormant apple seedlings are planted in black vita pots and watered. Methyl bromide treated soil is used in the planting in order to eliminate any weed problem which would normally arise. Fertilizer in the form of a liquid is applied as needed to provide hearty leaf growth. Trees to be used in an experiment are selected as to uniformity and sprayed with the compound to be tested in the laboratory with a mechanical spraying device in order to achieve uniformity between treatments. Trees selected for the tests are sprayed with a spore suspension of Venturia inaequalis conidia in a concentration of approximately 2,500,000 spores per ml. of water. The spore suspension is sprayed uniformly over the foliage of treated and untreated trees, then the plants are placed in an incubator chamber for 24 hours, then in a greenhouse. The experiment is evaluated two weeks later. 1-trichloromethylthio-2-benzimidazolinone received a rating of 1 on this test for severity of the diseases. A rating of 1 for the severity of the disease means that the disease was 95–100% controlled.

It is intended to cover all changes and modifications of the examples of the invention herein chosen for purposes of disclosure which do not constitute departures from the spirit and scope of the invention.

I claim:

1. A compound of the formula

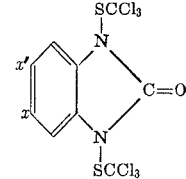

where $x$ and $x'$ are selected from the group consisting of hydrogen, lower alkyl, $NO_2$ and halogen.

2. 1,3-bis(trichloromethylthio)-2-benzimidazolinone.

3. 1,3 - bis(trichloromethylthio) - 5,6-dichloro-2-benzimidazolinone.

4. 1,3 - bis(trichloromethylthio) - 5 - chloro-2-benzimidazolinone.

References Cited

UNITED STATES PATENTS

| 2,974,085 | 3/1961 | Bartels et al. | 260—30/ |
| 3,249,620 | 5/1966 | Kühle et al. | 260—309.2 |

FOREIGN PATENTS 621,711   2/1963   Belgium.

OTHER REFERENCES

Kühle et al., Angewandte Chemie, vol. 76, pages 807–16 (Oct. 7, 1964).

Rhone-Poulenc Derwent Belgian Patents Report No. 88B, page 4 of section 3 (Pharmaceuticals, Photographic), Belgian Patent 608,930 (1962).

HENRY R. JILES, Primary Examiner.

N. TROUSOF, Assistant Examiner.